United States Patent
Gruner et al.

(10) Patent No.: US 11,260,960 B2
(45) Date of Patent: Mar. 1, 2022

(54) FLAP ACTUATION SYSTEM FOR AIRCRAFT

(71) Applicant: The Boeing Company, Chicago, IL (US)

(72) Inventors: Bryan J. Gruner, Bellevue, WA (US); Kevin Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 16/506,206

(22) Filed: Jul. 9, 2019

(65) Prior Publication Data

US 2021/0009255 A1 Jan. 14, 2021

(51) Int. Cl.
*B64C 13/34* (2006.01)
*B64C 9/00* (2006.01)

(52) U.S. Cl.
CPC .............. *B64C 13/34* (2013.01); *B64C 9/00* (2013.01)

(58) Field of Classification Search
CPC .... B64C 9/00; B64C 9/20; B64C 9/16; B64C 13/34
See application file for complete search history.

(56) References Cited

U.S. PATENT DOCUMENTS

| 2,779,555 | A | * | 1/1957 | Danielson | ................. B64C 9/16 244/216 |
| 4,248,395 | A | | 2/1981 | Cole | |
| 4,605,187 | A | * | 8/1986 | Stephenson | ............... B64C 9/18 244/216 |
| 10,047,827 | B2 | * | 8/2018 | Bae | ......................... B64C 13/28 |
| 2005/0040294 | A1 | | 2/2005 | Perez-Sanchez et al. | |
| 2012/0091283 | A1 | | 4/2012 | Uchida et al. | |
| 2013/0075537 | A1 | | 3/2013 | Sakurai et al. | |
| 2017/0305533 | A1 | * | 10/2017 | Viennot | .................. F16H 35/10 |
| 2018/0003243 | A1 | * | 1/2018 | Schwartz | .................. F16D 3/06 |
| 2018/0155053 | A1 | * | 6/2018 | Wang | ..................... B64C 13/34 |

FOREIGN PATENT DOCUMENTS

EP 3015363 5/2016

OTHER PUBLICATIONS

Extended European Search Report concerning EP Patent Application No. 20178261.2 dated Nov. 26, 2020.
https://www.youtube.com/watch?v=S0fAeqzlA3k accessed Jul. 9, 2019.

* cited by examiner

*Primary Examiner* — Christopher D Hutchens
(74) *Attorney, Agent, or Firm* — Kunzler Bean & Adamson

(57) ABSTRACT

Disclosed herein is a system for actuating a flap coupled to a wing of an aircraft in a streamwise direction. The system comprises a geared rotary actuator comprising a drive gear that is rotatable about a first rotational axis. The system also comprises a crank shaft comprising a driven gear in gear meshing engagement with the drive gear of the geared rotary actuator to rotate the crank shaft about a second rotational axis. The second rotational axis is angled relative to the first rotational axis. The system further comprises a crank arm co-rotatably coupled to the crank shaft and configured to be coupled to the flap. Rotation of the crank shaft about the second rotational axis rotates the crank arm in a direction perpendicular to the second rotational axis.

20 Claims, 10 Drawing Sheets

FLAP ACTUATION SYSTEM FOR AIRCRAFT

FIELD

This disclosure relates generally to aircraft, and more particularly to systems for actuating flaps coupled to wings of aircraft.

BACKGROUND

The flaps coupled to aircraft wings are used to regulate the lift generated by the wings. For example, flaps are extended to increase drag and lift during take-off and landing and are retracted at cruising speeds. Flaps are extended and retracted along a set path of motion. Actuating flaps along a set path of motion in the streamwise direction, particularly with the swept and relatively thin wings of today's commercial aircraft, in a cost efficient, simple, and lightweight manner can be difficult.

SUMMARY

The subject matter of the present application has been developed in response to the present state of the art, and in particular, in response to shortcomings of conventional flap actuation systems and methods. The subject matter of the present application provides examples of a flap actuation system, and corresponding methods, for an aircraft that overcome the above-discussed shortcomings of prior art techniques.

Disclosed herein is a system for actuating a flap coupled to a wing of an aircraft in a streamwise direction. The system comprises a geared rotary actuator, comprising a drive gear that is rotatable about a first rotational axis. The system also comprises a crank shaft, comprising a driven gear in gear meshing engagement with the drive gear of the geared rotary actuator to rotate the crank shaft about a second rotational axis. The second rotational axis is angled relative to the first rotational axis. The system further comprises a crank arm, co-rotatably coupled to the crank shaft and configured to be coupled to the flap. Rotation of the crank shaft about the second rotational axis rotates the crank arm in a direction perpendicular to the second rotational axis. The preceding subject matter of this paragraph characterizes example 1 of the present disclosure.

When the second rotational axis is perpendicular relative to the streamwise direction, the first rotational axis is parallel to a spanwise direction of the wing. The preceding subject matter of this paragraph characterizes example 2 of the present disclosure, wherein example 2 also includes the subject matter according to example 1, above.

The drive gear comprises a bevel gear and the driven gear comprises a spool gear. The preceding subject matter of this paragraph characterizes example 3 of the present disclosure, wherein example 3 also includes the subject matter according to any one of examples 1-2, above.

The crank shaft comprises a central channel that is coaxial with the second rotational axis and extends entirely through the crank shaft. A diameter of the central channel varies along the second rotational axis. The preceding subject matter of this paragraph characterizes example 4 of the present disclosure, wherein example 4 also includes the subject matter according to any one of examples 1-3, above.

The diameter of the central channel decreases and increases along the second rotational axis. The preceding subject matter of this paragraph characterizes example 5 of the present disclosure, wherein example 5 also includes the subject matter according to example 4, above.

The crank shaft comprises a central portion having a constant outer dimension along the second rotational axis. The crank shaft also comprises a first flared portion having an increasing outer dimension away from the central portion along the second rotational axis. The crank shaft further comprises a second flared portion spaced apart from the first flared portion by the central portion and having an increasing outer dimension away from the central portion along the second rotational axis. The preceding subject matter of this paragraph characterizes example 6 of the present disclosure, wherein example 6 also includes the subject matter according to any one of examples 4-5, above.

The diameter of the central channel is constant within the central portion, increases within the first flared portion away from the central portion, and increases within the second flared portion away from the central portion. The preceding subject matter of this paragraph characterizes example 7 of the present disclosure, wherein example 7 also includes the subject matter according to example 6, above.

The central portion has a non-round cross-sectional shape along a plane perpendicular to the second rotational axis. The preceding subject matter of this paragraph characterizes example 8 of the present disclosure, wherein example 8 also includes the subject matter according to any one of examples 6-7, above.

The crank arm comprises a first part and a second part attached together about the central portion of the crank shaft. The first part and the second part define a crank aperture shaped to complement the non-round cross-sectional shape of the central portion. The preceding subject matter of this paragraph characterizes example 9 of the present disclosure, wherein example 9 also includes the subject matter according to example 8, above.

The system further comprises a torque shaft passing through the geared rotary actuator and the central channel of the crank shaft. The torque shaft is rotatably coupled with the drive gear to drive rotation of the drive gear about the first rotational axis. The torque shaft passes through the central channel of the crank shaft without contacting the crank shaft. The torque shaft is angled relative to the second rotational axis as the torque shaft passes through the central channel. The preceding subject matter of this paragraph characterizes example 10 of the present disclosure, wherein example 10 also includes the subject matter according to any one of examples 4-9, above.

The torque shaft is rotatable about the first rotational axis. The preceding subject matter of this paragraph characterizes example 11 of the present disclosure, wherein example 11 also includes the subject matter according to example 10, above.

The system further comprises a torque tube, surrounding and concentric with the torque shaft. The torque tube is co-rotatably coupled with the torque shaft. The torque tube is in direct gear meshing engagement with the geared rotatory actuator to transfer torque from the torque shaft to the geared rotary actuator. The preceding subject matter of this paragraph characterizes example 12 of the present disclosure, wherein example 12 also includes the subject matter according to any one of examples 10-11, above.

The geared rotary actuator comprises a housing. The drive gear is located at least partially within the housing. At least a portion of the crank shaft is located within the housing. The preceding subject matter of this paragraph characterizes example 13 of the present disclosure, wherein example 13 also includes the subject matter according to any one of examples 1-12, above.

The system further comprises a first support rib, perpendicular to the second rotational axis and comprising a mounting surface. The system also comprises a second support rib, parallel to and spaced apart from the first support rib. The crank shaft is interposed between the first support rib and the second support rib. The geared rotary actuator is coupled directly to the second support rib. The preceding subject matter of this paragraph characterizes example 14 of the present disclosure, wherein example 14 also includes the subject matter according to any one of examples 1-13, above.

The crank shaft is hollow and has a spool shape. The preceding subject matter of this paragraph characterizes example 15 of the present disclosure, wherein example 15 also includes the subject matter according to any one of examples 1-14, above.

Further disclosed herein is an aircraft that comprises a body. The aircraft also comprises a wing, coupled to and extending from the body in a spanwise direction. The aircraft also comprises a flap, coupled to the wing and extendable from the wing. The aircraft further comprises a system, coupled to the wing. The system comprises a geared rotary actuator, comprising a drive gear that is rotatable about a first rotational axis. The system also comprises a crank shaft, comprising a driven gear in gear meshing engagement with the drive gear of the geared rotary actuator to rotate the crank shaft about a second rotational axis. The second rotational axis is angled relative to the first rotational axis. The system further comprises a crank arm, co-rotatably coupled to the crank shaft and coupled with the flap. Rotation of the crank shaft about the second rotational axis rotates the crank arm and moves the flap in a direction perpendicular to the second rotational axis. The preceding subject matter of this paragraph characterizes example 16 of the present disclosure.

The first rotational axis is parallel to a spanwise direction of the wing. The direction perpendicular to the second rotational axis is a streamwise direction of the wing. The preceding subject matter of this paragraph characterizes example 17 of the present disclosure, wherein example 17 also includes the subject matter according to example 16, above.

The crank shaft comprises a central channel that is coaxial with the second rotational axis and extends entirely through the crank shaft. A diameter of the central channel varies along the second rotational axis. The system further comprises a torque shaft passing through the geared rotary actuator and the central channel of the crank shaft. The system further comprises a torque tube, co-rotatably coupled with the torque shaft and rotatably coupled with the drive gear to drive rotation of the drive gear about the first rotational axis. The torque shaft passes through the central channel of the crank shaft without contacting the crank shaft. The torque shaft and the torque tube are rotatable about the first rotational axis. The preceding subject matter of this paragraph characterizes example 18 of the present disclosure, wherein example 18 also includes the subject matter according to any one of examples 16-17, above.

The aircraft further comprises a second flap, coupled to the wing and extendable from the wing. The aircraft also comprises a second system, having the same features as the system, coupled to the wing. The crank arm of the second system is coupled to the second flap. The system further comprises a second torque tube co-rotatably coupled with the torque shaft and rotatably coupled with the drive gear of the geared rotary actuator of the second system to drive rotation of the drive gear of the geared rotary actuator of the second system about the first rotational axis. The preceding subject matter of this paragraph characterizes example 19 of the present disclosure, wherein example 19 also includes the subject matter according to example 18, above.

Additionally disclosed herein is a method of actuating a flap, coupled to a wing of an aircraft, in a streamwise direction relative to the wing. The method comprises rotating a drive gear of a geared rotary actuator about a first rotational axis that is parallel to a spanwise direction of the wing. The method also comprises transferring torque to a driven gear of a crank shaft to rotate the driven gear of the crank shaft about a second rotational axis that is angled relative to the first rotational axis and is perpendicular to the streamwise direction. The method further comprises rotating a crank arm in the streamwise direction in response to rotation of the driven gear about the second rotational axis. The method additionally comprises translationally moving the flap in the streamwise direction in response to the crank arm moving in the streamwise direction. The preceding subject matter of this paragraph characterizes example 20 of the present disclosure.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a system for actuating a flap coupled to the wing of an aircraft. The system allows the flap to be actuated in the streamwise direction by a geared rotary actuator that is in-line with a torque tube extending in the spanwise direction of the wing. The geared rotary actuator facilitates actuation of the flap in the streamwise direction while providing significant Fowler motion range. Moreover, the compactness of the geared rotary actuator allows it to fit within the relatively thin wings of today's modern aircraft. Additionally, arranging the geared rotary actuator in-line with the torque tube helps to simplify the system, reduce weight, and efficiently transfer power from the torque tube to the geared rotary actuator and then to the flap.

Figure 1:
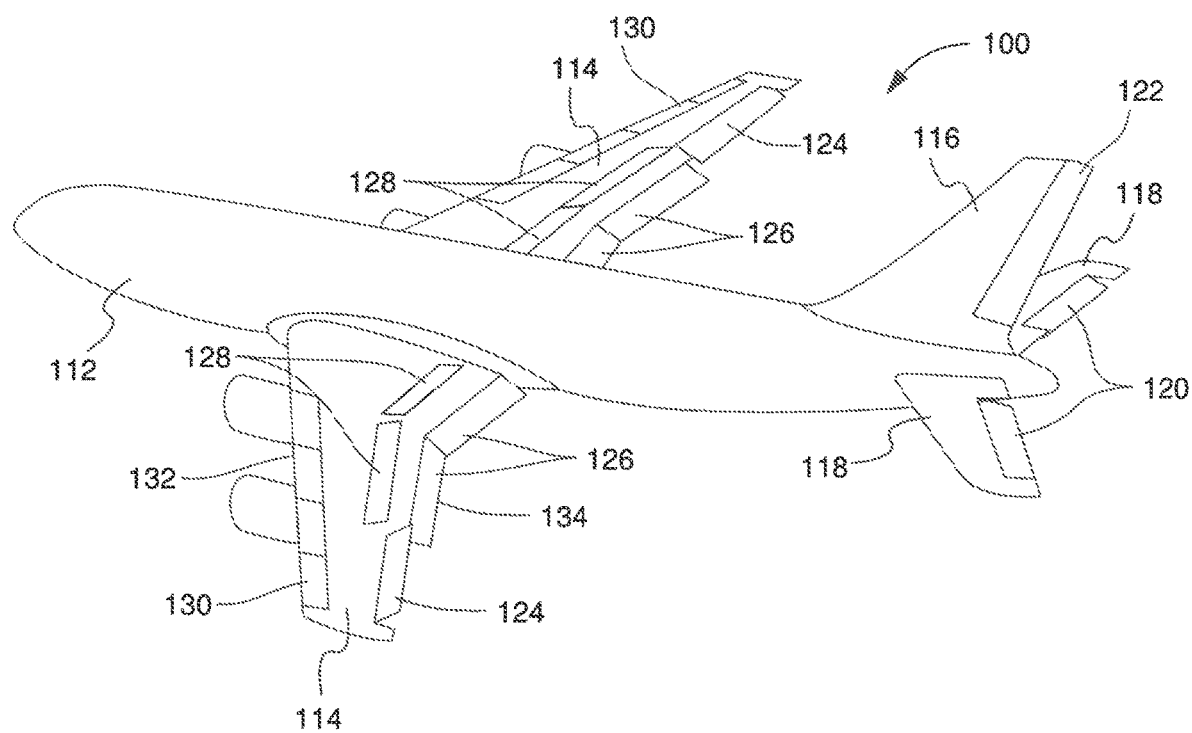
FIG. 1 is a perspective view of an aircraft, according to one or more examples of the present disclosure.

Referring to FIG. 1, one embodiment of an aircraft 100 is shown. The aircraft 100 can be any of various types of aircraft, such as commercial aircraft used for the transportation of passengers, military aircraft for military operations, personal aircraft, and the like. As depicted, the aircraft 100 represents a passenger airplane. The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116.

Figure 4:
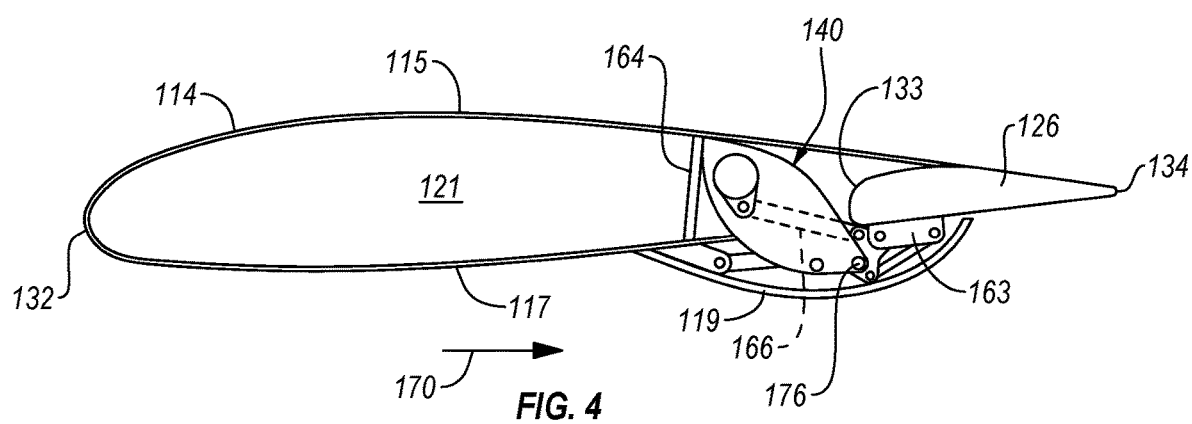
FIG. 4 is a cross-sectional side view of a wing, flap, and flap actuation system of an aircraft, according to one or more examples of the present disclosure.
Figure 5:
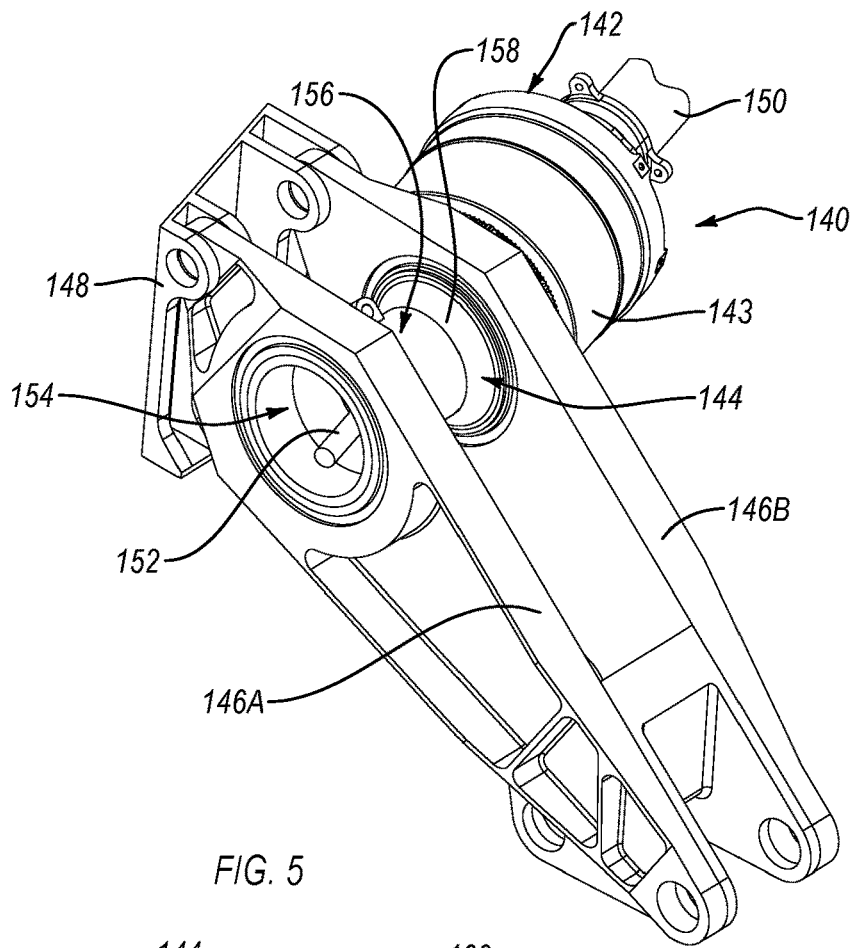
FIG. 5 is a perspective view of a flap actuation system, from one side of the flap actuation system, according to one or more examples of the present disclosure.

Referring to FIG. 4, each wing 114 includes an outer upper surface 115 and an outer lower surface 117. The outer upper surface 115 is opposite the outer lower surface 117. Furthermore, the outer upper surface 115 and the outer lower surface 117 converge at a leading edge 132 of the wing 114. The outer upper surface 115 and the outer lower surface 117 extend chordwise away from the leading edge 132 and terminate at trailing locations. Each wing 114 includes an interior cavity 121 defined between the outer upper surface 115 and the outer lower surface 117. As shown in FIG. 4, each wing 114 includes a rear spar 164 (e.g., rearwardmost spar) in the interior cavity 121. The rear spar 164 extends between an upper skin of the wing 114, defining the outer upper surface 115, and a lower skin of the wing 114, defining the outer lower surface 117. Additionally, the rear spar 164 extends spanwise along a length or span of the wing 114. In other words, as defined herein, a spanwise direction 172 is a direction parallel to the rear spar 164, which, in view of the sweep of the wing 114, is not perpendicular to the streamwise direction 170 or a centerline of the body 112 of the aircraft 100 in certain examples. Although not shown, the wing 114 may include other internal structures, such as stringers, additional spars, and ribs, within the interior cavity 121 that rigidify and maintain the shape of the wing 114.

The aircraft 100 further includes a plurality of adjustable elements, which can be adjustable aerodynamic surfaces that are adjustable to change the characteristics of air flow over, around, and trailing the surfaces. For example, each wing 114, has coupled thereto, an aileron 124, flaps 126, spoilers 128, and slats 130. Additionally, the vertical stabilizer 116 includes a rudder 122, and each horizontal stabilizer 118 includes an elevator 120. For responsive control of the flight of the aircraft 100, the relative position of the adjustable aerodynamic surfaces of the aircraft, such as those shown in FIG. 1, should be capable of precise adjustment.

Figure 2:
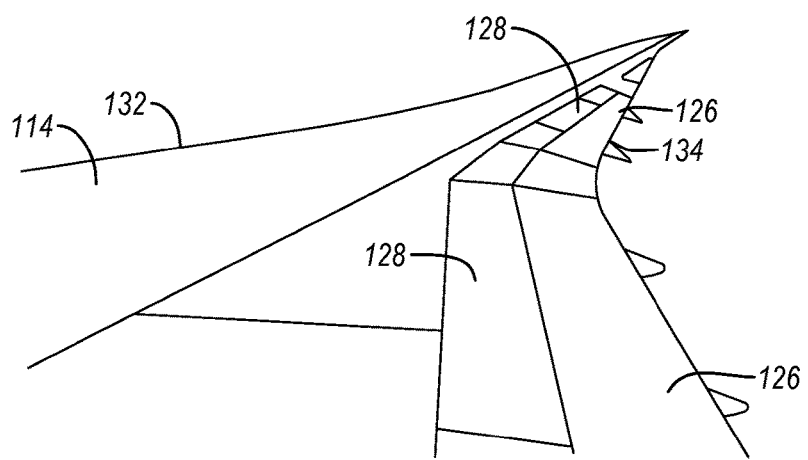
FIG. 2 is a perspective view of a wing of an aircraft, with flaps in a retracted position, according to one or more examples of the present disclosure.
Figure 3:
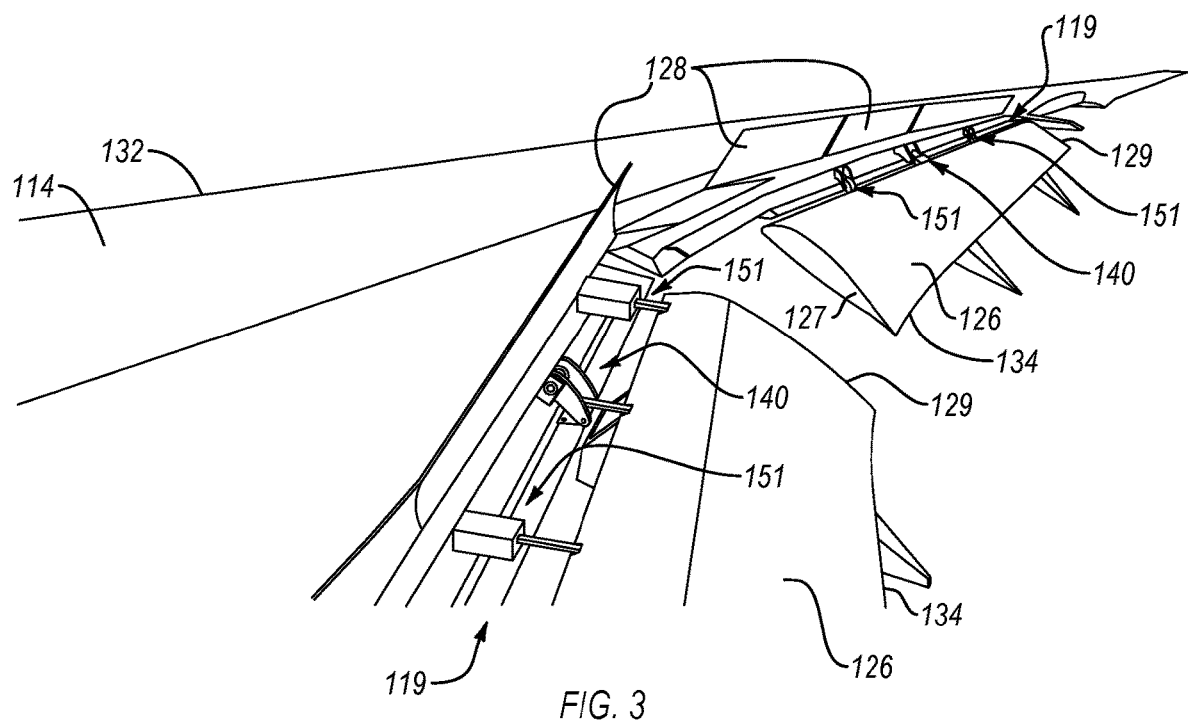
FIG. 3 is a perspective view of the wing of FIG. 2, with the flaps in an extended position, according to one or more examples of the present disclosure.

The flaps 126 are coupled to the wings 114 and selectively actuatable relative to the wings 114 to promote desired flight characteristics of the aircraft 100. In particular, each flap 126 is extendable, in a streamwise direction 170 (see, e.g., FIGS. 4 and 7) away from a corresponding wing 114 into an extended position and retractable, in the streamwise direction 170, towards the corresponding wing 114 into a retracted position. In the retracted position (e.g., flap-up position), such as shown in FIGS. 2 and 4, a combined camber of the wing 114 and flap 126 is at a minimum, which reduces lift and drag. Accordingly, the flaps 126 are typically in the retracted position while the aircraft 100 is cruising at altitude. In the extended position (e.g., flap-down position), such as shown in FIG. 3, the combined camber of the wing 114 and flap 126 is at some camber greater than the minimum (e.g., at a maximum), which increases lift and drag. Accordingly, the flaps 126 are typically in the extended position while the aircraft 100 is flying at lower speeds, such as during approaches, take-offs, and landings. To further increase lift and reduce drag, the spoilers 128 can be raised as shown in FIG. 3.

Referring to FIG. 3, each flap 126 includes an inboard end 127 and an outboard end 129. The outboard end 129 is opposite the inboard end 127. In some implementations, the flap 126 is a long, thin structure with an aerodynamic profile.

For example, the flap 126 can be elongated in a lengthwise direction extending from the inboard end 127 to the outboard end 129. The cross-sectional shape or aerodynamic profile of the flap 126 is based on the cross-sectional shape or aerodynamic profile of the wing 114. Generally, the flap 126 functions as a chordwise extension of the wing 114. More specifically, the wing 114 includes a flap slot within which the flap 126 is stored in the retracted position. As shown in FIG. 4, the profile of the flap 126 is configured such that in the retracted position, the outer surfaces of the flap 126 are substantially flush with the outer surfaces of the wing 114. In particular, when retracted, the flap 126 abuts the trailing end of the outer lower surface 117 of the wing 114 to form a near seamless transition between the outer lower surface 117 and the flap 126. Similarly, with the flap 126 retracted and the spoiler 128 lowered, the flap 126 abuts the spoiler 128, which is hingedly coupled to the trailing end of the outer upper surface 115 to form a near seamless transition between the outer upper surface 115, the spoiler 128, and the flap 126. Accordingly, as shown in FIG. 2, when the flap 126 is in the retracted position and the spoilers 128 are lowered, the combined cross-sectional profile of the wing 114, the spoiler 128, and the flap 126 define a conventional airfoil shape. In this manner, as shown in FIG. 4, a trailing edge 134 of the flap 126 in effect acts as the trailing edge of the wing 114, opposite the leading edge 132 of the wing 114.

Referring to FIG. 4, the flap 126 includes a primary axis 176 about which the flap 126 is rotatable. The primary axis 176 defines a primary rotational axis about which the flap 126 rotates when the flap 126 is actuated by a flap actuation system 140, as described below. In some implementations, the primary axis 176 is defined by a continuous rod or pin, or co-axially aligned rod or pin segments, translationally fixed relative to the leading edge 132 of the wing 115. The leading edge 133 of the flap 126 is opposite the trailing edge 134 of the flap 126. The primary axis 176 is indirectly coupled to the flap 126 by linkages and a mounting bracket 163 fixed to the flap 126. The primary axis 176 extends through aligned apertures in support ribs of the flap actuation system 140 and facilitates rotation of the flap 126 relative to the wing 115 as the flap 126 is actuated by an actuation arm 166 of the flap actuation system 140. In other words, the actuation system 140 helps to rotatably couple together the flap 126 and the wing 114 at the primary axis 176. The actuation system 140 may extend below the nominal airfoil of the wing 114 into a space defined by a fairing 119 coupled to the wing 114.

Referring again to FIG. 3, the aircraft 100 may additionally include at least one auxiliary support system 151. However, it is recognized that the flap actuation system 140 of the present disclosure can function with or without an auxiliary support system 151. In general, the flap actuation system 140 initiates and drives actuation of the flap 126 relative to the wing 114 and, if present, the auxiliary support system 151 mechanically supports the flap 126 at an auxiliary location of the flap 126 as the flap 126 is actuated. In other words, the auxiliary support system 151 is configured to limit deflection and bending of the flaps 126 when extended, and while extending and retracting, during flight at the auxiliary location of the flap 126 to which the auxiliary support system 151 is coupled. The auxiliary location of the flap 126 is a location on the flap 126 spaced apart, along a length of the flap 126, from the flap actuation system 140. For example, the flap actuation system 140 is spaced apart from the auxiliary support system 151 in a spanwise direction 172 along the wing 114.

The flap actuation system 140 is selectively operable to extend the flap 126 from the wing 114 along an extension path and retract the flap 126 toward the wing 114 along the same extension path. The extension path represents the translational movement of the flap 126 as the flap actuation system 140 actuates the flap 126. Accordingly, the flap actuation system 140 includes linkages, including the actuation arm 166, configured to move the leading edge 133 of the flap 126, along the extension path as the flap actuation system 140 actuates the flap 126. The flap actuation system 140 is actuated in a first manner (e.g., rotation of a crank shaft 144 in one direction) to extend the flap 126 from the retracted position (see, e.g., FIG. 2) along the extension path away from the wing 114 in an extension direction to the extended position (see, e.g., FIG. 3). Similarly, the actuator 141 is actuated in a second manner (e.g., rotation of the crank shaft 144 in an opposite direction) to retract the flap 126 from the extended position along the extension path toward the wing 114 in a retraction direction, opposite the extension direction, to the retracted position. In one implementation, the extension path includes a linear portion (e.g., Fowler motion) and a curved portion (e.g., camber motion).

In some implementations, the linkages of the flap actuation system 140 are further configured to rotate the flap 126 about the primary axis 176 as the flap 126 translationally moves along the extension path. In this manner, the flap 126 may experience translational movement and rotational movement as the flap 126 is extended and retracted by the flap actuation system 140.

Figure 6:
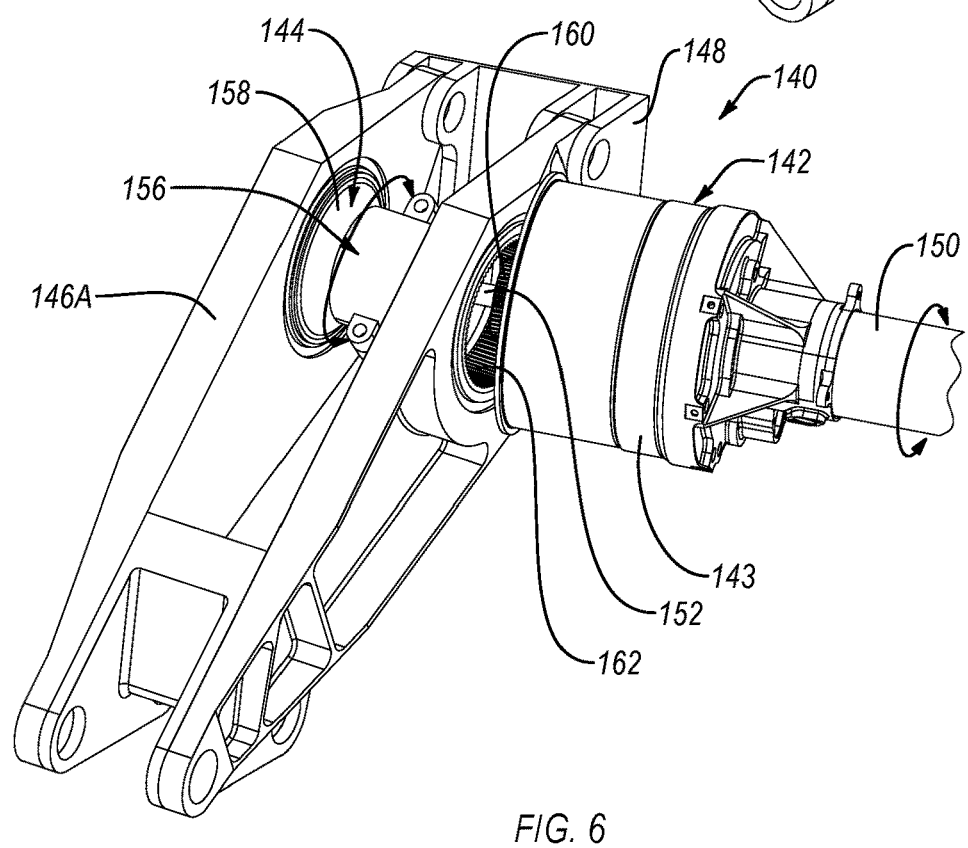
FIG. 6 is a perspective view of the flap actuation system of FIG. 5, from another side of the flap actuation system, according to one or more examples of the present disclosure.
Figure 7:
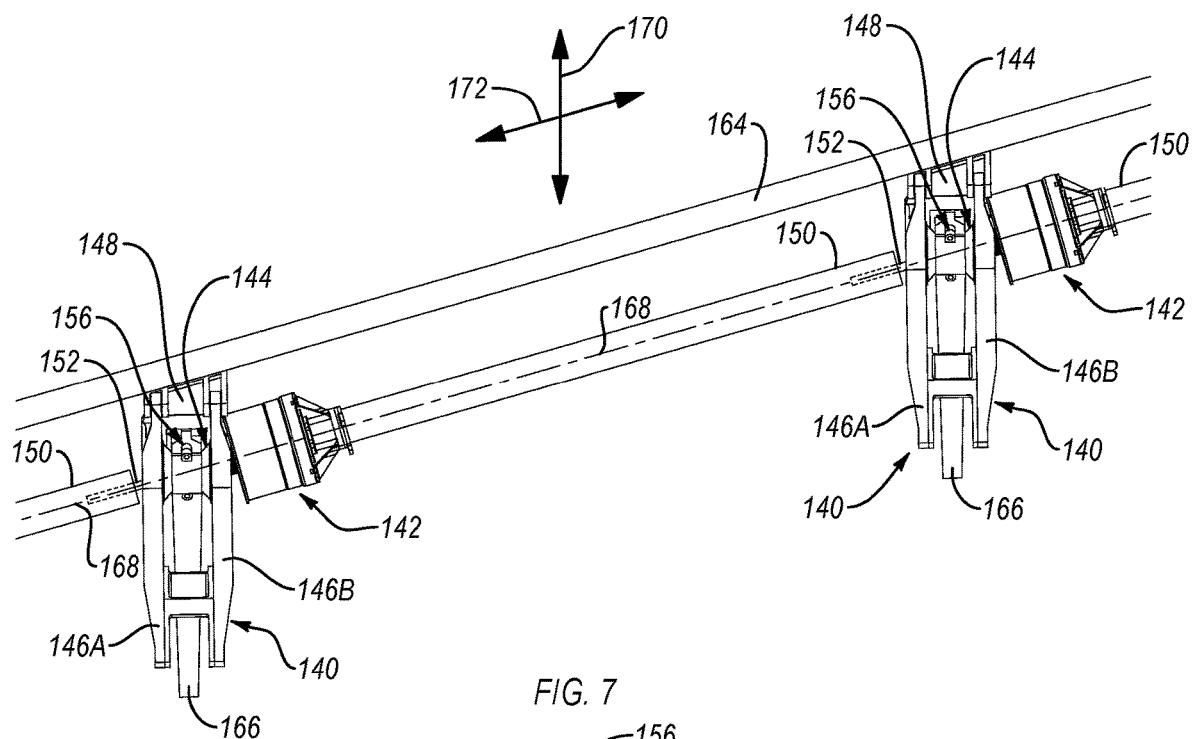
FIG. 7 is a top plan view of two flap actuation systems coupled together by a common torque shaft, according to one or more examples of the present disclosure.

Referring to FIGS. 6 and 7, according to one example, the flap actuation system 140 includes a geared rotatory actuator 142 and a crank shaft 144. The geared rotary actuator 142 includes a drive gear 160 that is rotatable about a first rotational axis 168 (see, e.g., FIG. 8). The geared rotatory actuator 142 also includes a housing 143 that houses one or more planetary gear sets and at least partially houses the drive gear 160. The drive gear 160 is coupled with the planetary gear sets, which drive the drive gear 160. Accordingly, the drive gear 160 acts as an output of the geared rotatory actuator 142. The input of the geared rotary actuator 142 is provided by a torque tube 150. In other words, the torque tube 150 is coupled with the planetary gear sets of the geared rotary actuator 142 to transfer torque from the torque tube 150 to the planetary gear sets. The planetary gear sets are configured to reduce the rotational speed and increase the torque of the drive gear 160 relative to the rotational speed and torque of the torque tube 150.

The flap actuation system 140 further includes a torque shaft 152. The torque tube 150 is co-rotatably coupled with a torque shaft 152, such as via a splined engagement with the torque shaft 152. The torque tube 150 surrounds and is concentric with an end portion of the torque shaft 152. In other words, the torque tube 150 is hollow and the end portion of the torque shaft 152 passes into an end portion of a hollow central channel of the torque tube 150. In one example, the torque shaft 152 includes external splines that are in splined engagement with complementary internal splines of the torque tube 150 to facilitate co-rotation between the torque shaft 152 and the torque tube 150. According to certain examples, the torque shaft 152 is made of a first material and the torque tube 150 is made of a second material that is different than the first material. In one example, the first material (e.g., steel) is stronger than the second material (e.g., aluminum).

Torque, for driving the flap actuation system 140, is supplied directly to the torque tube 150 by a torque supply source of the aircraft 100. The torque shaft 152 passes through the geared rotary actuator 142 and the crank shaft 144 and reconnects with another section of the torque tube 150 as described below. In this manner, the torque shaft 152 facilitates the transfer of torque from one section of the torque tube 150, through the geared rotary actuator 142 and the crank shaft 144, and to another section of the torque tube 150. The torque supply source is located inboard of the wing 114, in some examples, or in the wing, in other examples, and can be any of various devices or systems configured to generate torque, such as motors, power take-off devices, and the like. The torque supply source rotates the torque tube 150 about the first rotational axis 168. Accordingly, the torque shaft 152, the torque tube 150, and the drive gear 160 of the geared rotary actuator 142 are concentric or rotate about the same axis. In this manner, the geared rotary actuator 142 is in-line with the torque shaft 152 and the torque tube 150. Such an in-line arrangement allows the torque tube 150 to be directly coupled to the geared rotary actuator 142 without intervening shafts and angled gear boxes, which would have been necessary to redirect the torque from the torque tube 150 to the geared rotary actuator 142 if the torque tube 150 was not in-line with the geared rotary actuator 142.

The crank shaft 144 of the flap actuation system 140 is rotated by the drive gear 160 of the geared rotary actuator 142. More specifically, the drive gear 160 rotates the crank shaft 144 about a second rotational axis 174 (see, e.g., FIG. 8). The second rotational axis 174 is angled relative to the first rotational axis 168. In other words, an angle θ is defined between the first rotational axis 168 and the second rotational axis 174. The angle θ is less than 90-degrees in some examples. According to certain examples, the angle θ is dependent on the sweep of the wing 114 or the angle defined between the spanwise direction 172 of the wing 114 and the body 112 of the aircraft 100. The greater the sweep of the wing 114 or the greater the angle between the spanwise direction 172 and the body 112, the greater the angle θ. Additionally, the second rotational axis 174 is perpendicular to the streamwise direction 170, which facilitates translational movement of the flap 126 in the streamwise direction 170. The first rotational axis 168 is angled at more or less than 90-degrees with respect to the streamwise direction 170. Accordingly, in order to ensure the second rotational axis 174 is perpendicular to the streamwise direction 170, the second rotational axis 174 is angled, at the angle θ, relative to the first rotational axis 168.

The crank shaft 144 includes a driven gear 162 in gear meshing engagement with the drive gear 160 of the geared rotary actuator 142. The drive gear 160 rotates the crank shaft 144 via the gear meshing engagement with the driven gear 162. The driven gear 162 rotates about the second rotational axis 174. Because the driven gear 162 rotates about an axis that is angled with respect to the axis about which the drive gear 160 rotates, the driven gear 162 and the drive gear 160 are configured to facilitate the transfer of rotation about one axis to another angled axis. Accordingly, in certain examples, at least one of the drive gear 160 or the driven gear 162 includes beveled teeth. In one example, the drive gear 160 is a bevel gear and the driven gear 162 is a spool gear.

Figure 11:
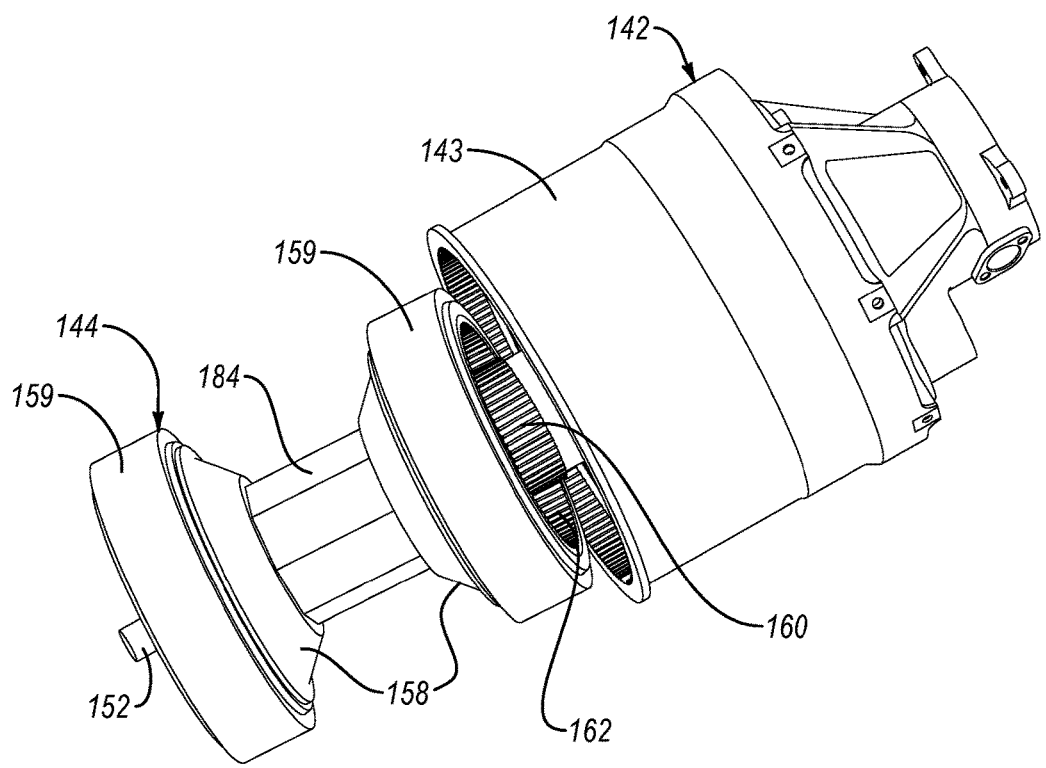
FIG. 11 is a perspective view of a geared rotary actuator and a crank shaft of a flap actuation system, according to one or more examples of the present disclosure.
Figure 12:
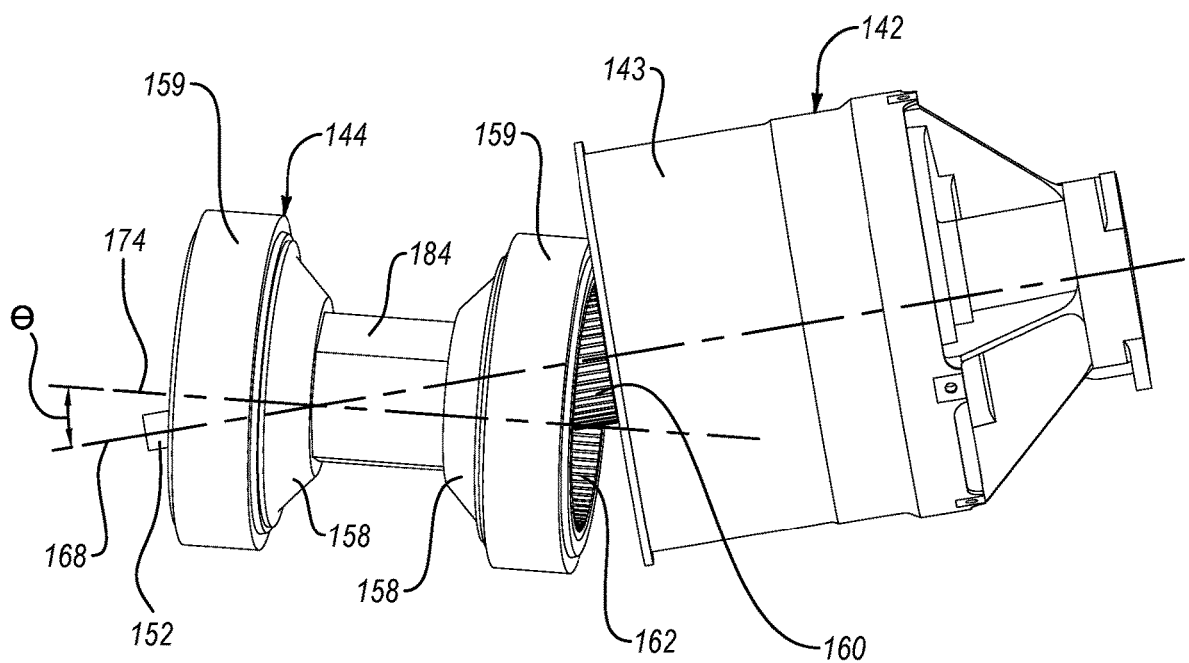
FIG. 12 is a perspective view of a geared rotary actuator and a crank shaft of a flap actuation system, according to one or more examples of the present disclosure.

Referring to FIGS. 11 and 12, the driven gear 162 is formed in at least one of two end portions 159 of the crank shaft 144. More specifically, the driven gear 162 includes an annular array of teeth formed in the inner surface of at least one of the two end portions 159. The crank shaft 144 additionally includes a central portion 184 interposed between the two end portions 159. The crank shaft 144 further includes two flared portions 158 interposed between the two end portions 159. Moreover, the central portion 184 is interposed between the two flared portions 158. In some examples, the central portion 184 has a constant outer dimension along the second rotational axis 174 and each of the flared portions 158 has an increasing outer dimension away from the central portion 184. The outer dimension of the flared portions 158 is a diameter in certain examples. The end portions 159 have a constant outer dimension along the second rotational axis 174. The outer dimensions of the flared portions 158 are larger than the outer dimension of the central portion 184. Additionally, the outer dimension of the end portions 159 is larger than the outer dimensions of the flared portions 158. Accordingly, the crank shaft 144 has a spool shape (e.g., a narrow middle tapering out to wider ends). The spool shape of the crank shaft 144 helps facilitate a central channel 154 of the crank shaft 144 that is also spool-shaped.

Figure 9:
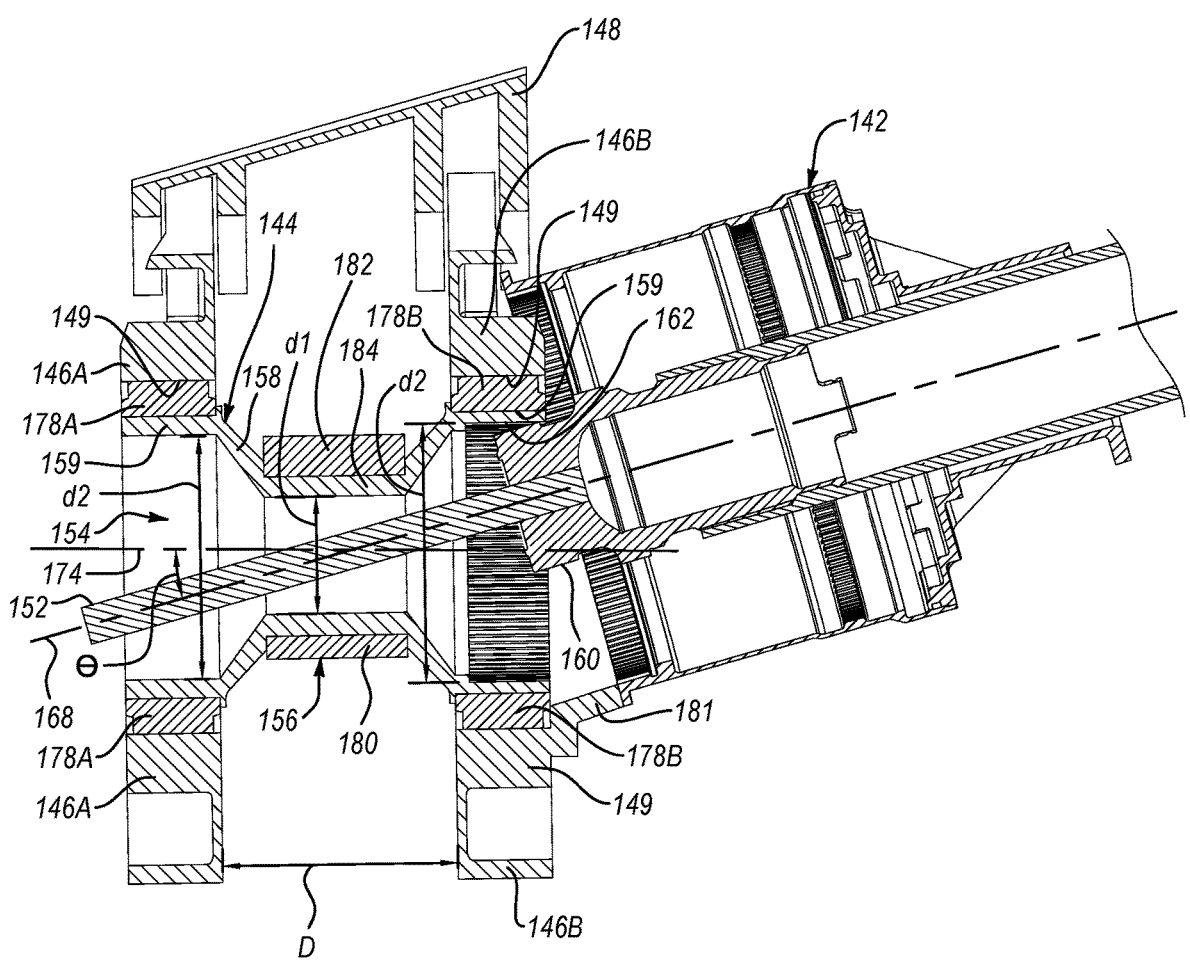
FIG. 9 is a cross-sectional top view of a flap actuation system, according to one or more examples of the present disclosure.
Figure 10:
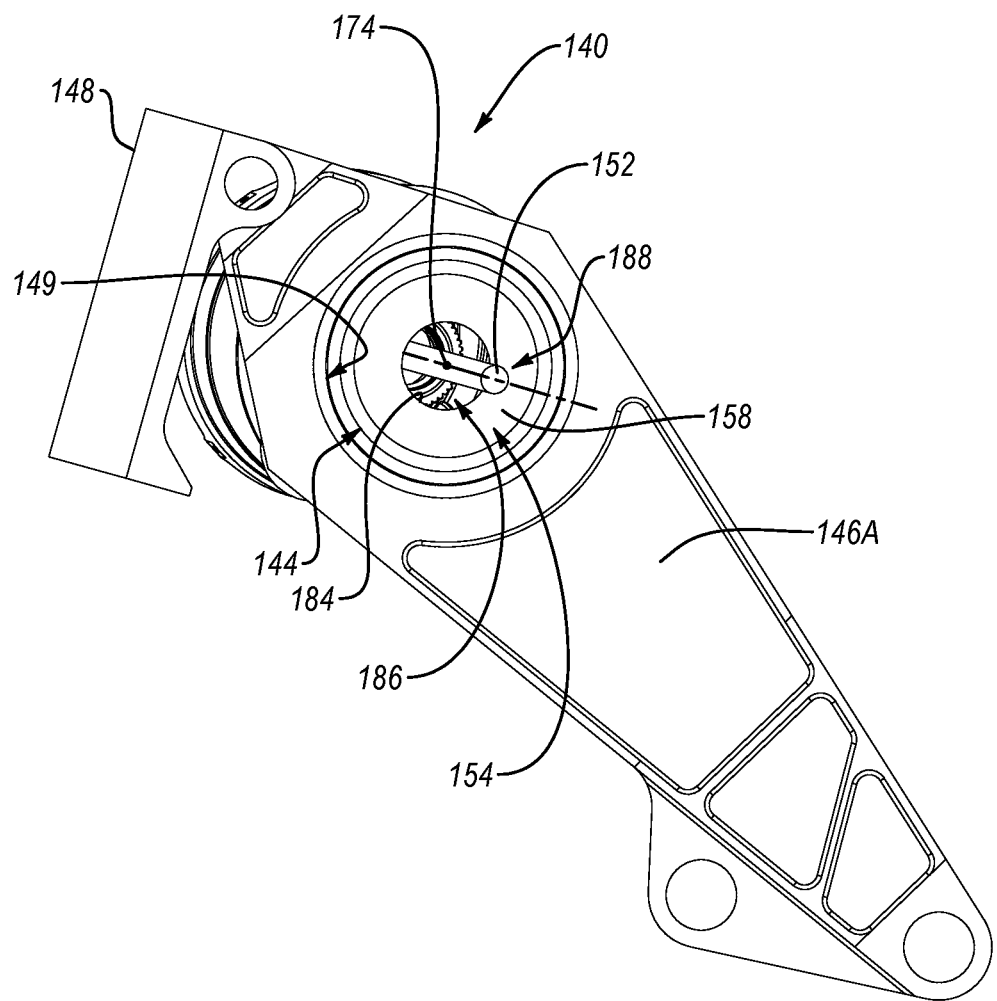
FIG. 10 is a side view of a flap actuation system, according to one or more examples of the present disclosure.

The central channel 154 of the crank shaft 144 extends entirely through the crank shaft 144 from one end portion 159 to an opposite end portion 159. Accordingly, the crank shaft 144 is hollow. Moreover, the central channel 154 is coaxial with the second rotational axis 174. The diameter (e.g., inner dimension) of the central channel 154 varies along the second rotational axis 174. More specifically, in some examples, from one end portion 159 to the other end portion 159, the diameter of the central channel 154 decreases and increases along the second rotational axis 174. In one example, the diameter of the central channel 154 is constant within the central portion 184 (e.g., first diameter (d1)), constant within the end portions 159 (e.g., second diameter (d2)), and increasing within the flared portions 158 from the central portion 184 to a corresponding one of the end portions 159. The second diameter (d2) of central channel 154 within the flared portions 158 is thus greater than the first diameter (d1) of central channel 154 within the central portion 184. Referring to FIG. 9, the varying diameter (e.g., increasing diameter away from the central portion 184) of the central channel 154 allows the torque shaft 152 to pass through the central channel 154, at an angle relative to the second rotational axis 174, without contacting or interfering with rotation of the crank shaft 144. The ratio of the first diameter (d1) to the second diameter (d2) is dependent on the angle θ and a distance D between a first support rib 146A and a second support rib 146B (see, e.g., FIG. 9). For example, the greater the angle θ and/or the greater the distance D, the lower the ratio of the first diameter (d1) to the second diameter (d2).

The portions of the crank shaft 144 are co-rotatable such that rotation of the driven gear 162, formed in one of the two end portions 159, results in rotation of the other end portion 159, the flared portions 158, and the central portion 184. According to one example, the central portion 184, the flared portions 158, and the end portions 159 form a one-piece, monolithic, seamless construction.

Referring to FIGS. 11 and 12, the housing 143 of the geared rotary actuator 142 is sized to allow at least a portion of the crank shaft 144 to be located within the housing 143. In the illustrated example, a portion of an end portion 159, including the driven gear 162, is located within the housing 143. This configuration facilitates compactness of the flap actuation system 140, which is desirable when space within the interior cavity 121 of the wing 114 is limited.

As shown in FIG. 9, the torque shaft 152 passes entirely through the geared rotary actuator 142 and the central channel 154 of the crank shaft 144. Accordingly, the crank shaft 144 is allowed to rotate independently, by virtue of the gear reduction facilitated by the geared rotary actuator 142, relative to the torque shaft 152. This allows the torque shaft 152 to distribute torque to the torque tube 150 leading to other flap actuation systems 140 for actuating other flaps. For example, as shown in FIG. 7 and from right to left, a first section of the torque tube 150 is directly coupled to a first geared rotary actuator 142 to drive the first geared rotary actuator 142. A first torque shaft 152 extends entirely through the first geared rotary actuator 142, and the central channel 154 of a first crank shaft 144, and is co-rotatably coupled to a second section of the torque tube 150 on an opposite side of the crank shaft 144. The second section of the torque tube 150 extends away from the first geared rotary actuator 142 and is directly coupled to a second geared rotary actuator 142 to drive the second geared rotary actuator 142. Another torque shaft 152, co-rotatably coupled with the second section of the torque tube 150, extends entirely through the second geared rotary actuator 142, and the central channel 154 of a second crank shaft 144, and is co-rotatably coupled to a third section of the torque tube 150 on an opposite side of the second crank shaft 144. The third section of the torque tube 150 can extend to a third geared rotary actuator (not shown) to drive the third geared rotary actuator, or it can extend to another driven system.

Before passing through the geared rotary actuator 140 and the crank shaft 144 of a flap actuation system 140, the torque shaft 152 receives torque from a section of the torque tube 150, on one side of the geared rotary actuator 140, and delivers torque to another section of the torque tube 150 on an opposite side of the geared rotary actuator 140. In FIG. 7, both flap actuation systems 140 are configured to actuate a corresponding one of two flaps 126 in the streamwise direction 170, while allowing the torque shaft 152 to pass through the flap actuation systems 140 at an angle relative to the streamwise direction 170.

Figure 8:
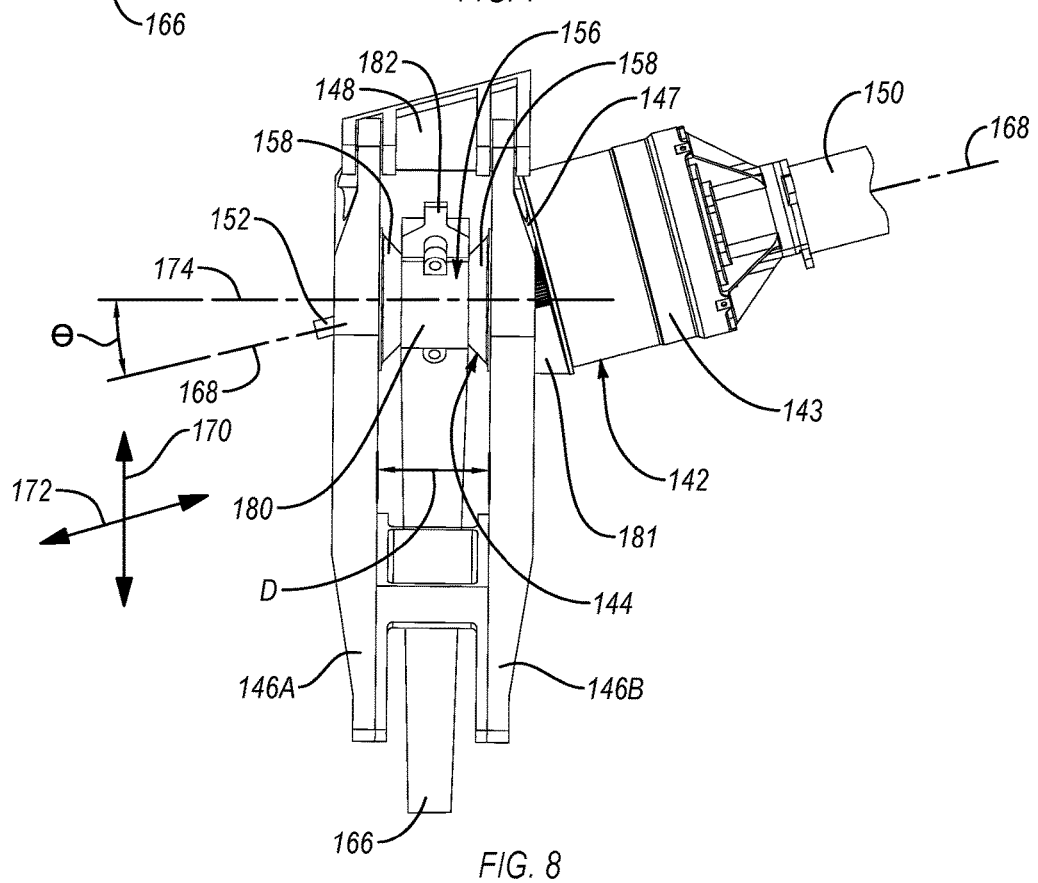
FIG. 8 is a top plan view of a flap actuation system, according to one or more examples of the present disclosure.
Figure 13:
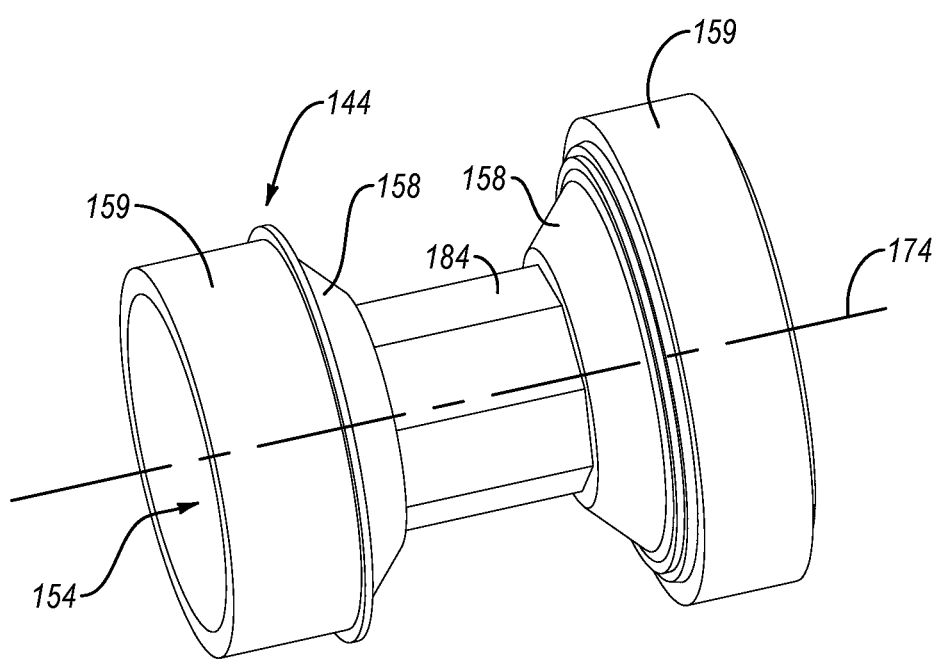
FIG. 13 is a perspective view of a crank shaft of a flap actuation system, according to one or more examples of the present disclosure.
Figure 14:
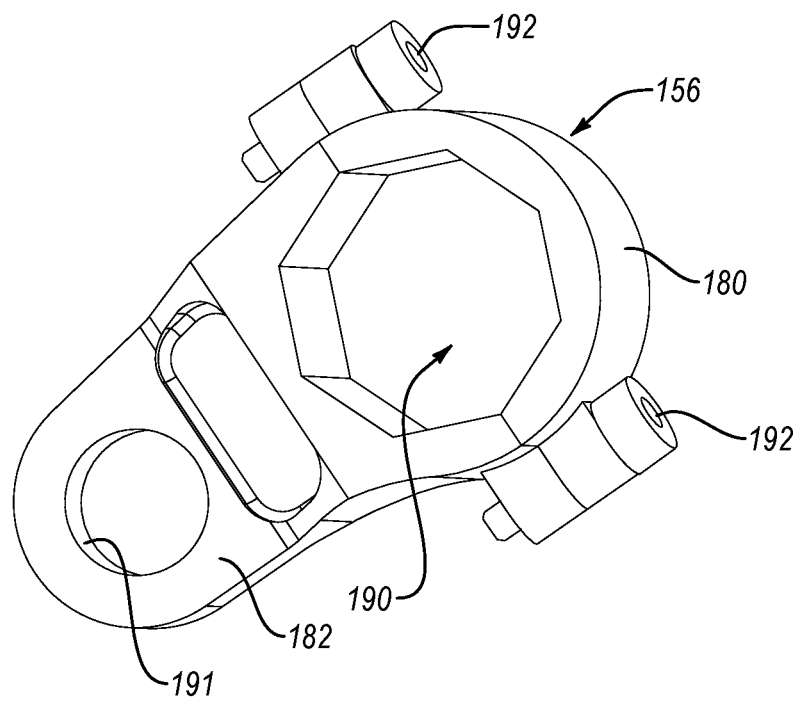
FIG. 14 is a perspective view of a shaft engagement portion of a crank arm of a flap actuation system, according to one or more examples of the present disclosure.
Figure 15:
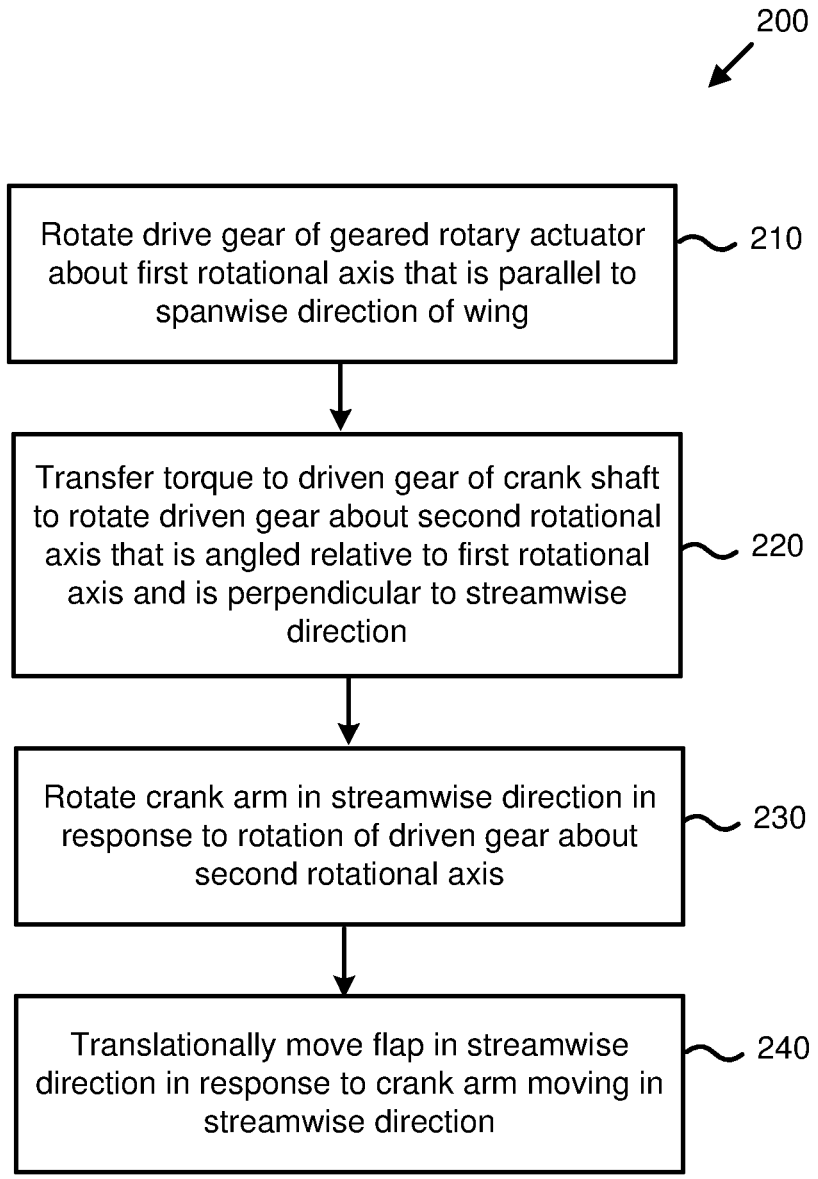
FIG. 15 is a method of actuating a flap, coupled to a wing of an aircraft, according to one or more examples of the present disclosure.

Referring to FIGS. 8 and 13, the flap actuation system 140 additionally includes a crank arm 156 coupled with the flap 126 to translationally move (e.g., extend or retract) the flap 126 when rotated. The crank arm 156 is co-rotatably coupled to the central portion 184 of the crank shaft 144. To facilitate coupling of the crank arm 156 to the central portion 184 after the torque shaft 152 is passed through the crank shaft 144, in some examples, the crank arm 156 includes a first part 180 and a second part 182 that are attached together about the central portion 184. The first part 180 and the second part 182, in effect, clamp down on the central portion 184 to retain the crank arm 156 in co-rotative coupling with the crank shaft 144. The first part 180 and the second part 182 are attached together via fasteners 192 in some examples.

To promote co-rotation of the crank arm 156 relative to the crank shaft 144, the central portion 184 has a non-round cross-sectional shape along a plane perpendicular to the second rotational axis 174. In one example, the non-round cross-sectional shape is octagonal. However, in other examples, the non-round cross-sectional shape can be hexagonal, ovular, triangular, or any other non-round cross-sectional shape. The first part 180 and the second part 182 of the crank arm 156 together define a crank aperture 190 having a shape that complements (e.g., matches) the cross-sectional shape of the central portion 184. In this manner, when the first part 180 and the second part 182 are attached about the central portion 184, the complementary non-round shapes of the crank aperture 190 and the central portion 184 resist relative rotation of the crank arm 156 and crank shaft 144. The second part 182 of the crank arm 156 further includes an arm aperture 191 configured to pivotally engage the support arm 166. The arm aperture 191 is located a distance away from the crank aperture 190. The distance corresponds with a desired travel or range of motion of the support arm 166, and thus the flap 126, as the crank shaft 144 rotates.

The flap actuation system 140 further includes a first support rib 146A and a second support rib 146B. The first support rib 146A is spaced apart from the second support rib 146B along the second rotational axis 174. Moreover, the first support rib 146A and the second support rib 146B are parallel to each other and perpendicular to the second rotational axis 174. The first support rib 146A and the second support rib 146B facilitate attachment of the geared rotary actuator 142 and the crank shaft 144 to the interior of the wing 114.

Referring to FIG. 8, the second support rib 146B includes a mounting surface 147 that is angled with respect to the second rotational axis 174. The mounting surface 147 helps to facilitate angled attachment of the geared rotary actuator 142 to the second support rib 146B. More specifically, the geared rotary actuator 142 is coupled directly to (e.g., flush against) the mounting surface 147 of the second support rib 146B. To provide further support for angled attachment of the geared rotatory actuator 142 to the second support rib 146B, the second support rib 146B may also include a mounting pad 181 protruding from the second support rib 146B. The mounting pad 181 defines a mounting surface co-planar with the mounting surface 147 such that the mounting surface of the mounting pad 181 is also angled with respect to the second rotational axis 174.

The crank shaft 144 is interposed between and rotatably coupled to the first support rib 146A and the second support rib 146B. More specifically, each of the first support rib 146A and the second support rib 146B includes apertures 149 configured to receive and rotatably support corresponding ones of the end portions 159 of the crank shaft 144. In some examples, a first bearing 178A is fitted in the aperture 149 of the first support rib 146A and a second bearing 178B is fitted in the aperture 149 of the second support rib 146B. The first bearing 178A and the second bearing 178B are interposed between respective end portions 159 of the crank shaft 144 and facilitate low-friction rotation of the crank shaft 144 relative to the first support rib 146A and the second support rib 146B, respectively. The first bearing 178A and the second bearing 178B can be ball bearings or other similar type of bearings.

The first support rib 146A and the second support rib 146B are non-movably fixed to the wing 114. In some examples, the flap actuation system 140 further includes a rear spar bracket 148 that helps non-movably secure the first support rib 146A and the second support rib 146B to the rear spar 164 of the wing 114.

According to some examples, a method 200 of using the flap actuation system 140 to actuate the flap 126 includes (block 210) rotating the drive gear 160 of the geared rotary actuator 142 about the first rotational axis 168. The drive gear 160 is rotated by rotating the torque shaft 152, and thus the torque tube 150, with a selectively controllable torque generator in one example. The method 200 further includes (block 220) transferring torque to the driven gear 162 of the crank shaft 144 to rotate the driven gear 162 of the crank shaft 144 about the second rotational axis 174. The torque is transferred to the driven gear 162 from the drive gear 160, such as via gear meshing engagement between the driven gear 162 and the drive gear 160. The method 200 additionally includes (block 230) rotating the crank arm 156 in the streamwise direction 170 in response to rotation of the driven gear 162 about the second rotational axis 174. The crank arm 156 is rotated as the driven gear 162 is rotated because the driven gear 162 is co-rotatably coupled to (e.g., co-formed with) the crank shaft 144 and the crank arm 156 is co-rotatably coupled to the crank shaft 144. The method 200 also includes (block 240) translationally moving the flap 126 in the streamwise direction 170 in response to the crank arm 156 moving in the streamwise direction 170. The crank arm 156 is movably coupled to the flap 126 via the actuation arm 166 and any of various other linkages, brackets, or beams.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for actuating a flap coupled to a wing of an aircraft in a streamwise direction, the system comprising:
    a geared rotary actuator, comprising a drive gear that is rotatable about a first rotational axis;
    a crank shaft, comprising a driven gear in gear meshing engagement with the drive gear of the geared rotary actuator to rotate the crank shaft about a second rotational axis, wherein the second rotational axis is angled relative to the first rotational axis; and
    a crank arm, co-rotatably coupled to the crank shaft and configured to be coupled to the flap, wherein rotation of the crank shaft about the second rotational axis rotates the crank arm in a direction perpendicular to the second rotational axis,
    wherein:
        the crank shaft comprises a central channel that is coaxial with the second rotational axis and extends entirely through the crank shaft; and
        a diameter of the central channel varies along the second rotational axis.

2. The system according to claim 1, wherein when the second rotational axis is perpendicular relative to the streamwise direction, the first rotational axis is parallel to a spanwise direction of the wing.

3. The system according to claim 1, wherein:
the drive gear comprises a bevel gear; and
the driven gear comprises a spool gear.

4. The system according to claim 1, wherein the diameter of the central channel decreases and increases along the second rotational axis.

5. The system according to claim 1, wherein the crank shaft comprises:
a central portion, having a constant outer dimension along the second rotational axis;
a first flared portion, having an increasing outer dimension away from the central portion along the second rotational axis; and
a second flared portion, spaced apart from the first flared portion by the central portion and having an increasing outer dimension away from the central portion along the second rotational axis.

6. The system according to claim 5, wherein the diameter of the central channel:
is constant within the central portion;
increases within the first flared portion away from the central portion; and
increases within the second flared portion away from the central portion.

7. The system according to claim 5, wherein the central portion has a non-round cross-sectional shape along a plane perpendicular to the second rotational axis.

8. The system according to claim 7, wherein:
the crank arm comprises a first part and a second part attached together about the central portion of the crank shaft; and
the first part and the second part define a crank aperture shaped to complement the non-round cross-sectional shape of the central portion.

9. The system according to claim 1, further comprising a torque shaft passing through the geared rotary actuator and the central channel of the crank shaft, wherein:
the torque shaft is rotatably coupled with the drive gear to drive rotation of the drive gear about the first rotational axis;
the torque shaft passes through the central channel of the crank shaft without contacting the crank shaft; and
the torque shaft is angled relative to the second rotational axis as the torque shaft passes through the central channel.

10. The system according to claim 9, wherein the torque shaft is rotatable about the first rotational axis.

11. The system according to claim 9, further comprising a torque tube, surrounding and concentric with the torque shaft, wherein:
the torque tube is co-rotatably coupled with the torque shaft; and
the torque tube is in direct gear meshing engagement with the geared rotary actuator to transfer torque from the torque shaft to the geared rotary actuator.

12. The system according to claim 1, wherein:
the geared rotary actuator comprises a housing;
the drive gear is located at least partially within the housing; and
at least a portion of the crank shaft is located within the housing.

13. The system according to claim 1, further comprising:
a first support rib, perpendicular to the second rotational axis and comprising a mounting surface; and
a second support rib, parallel to and spaced apart from the first support rib;
wherein:
the crank shaft is interposed between the first support rib and the second support rib; and
the geared rotary actuator is coupled directly to the mounting surface of the first support rib.

14. The system according to claim 1, wherein the crank shaft is hollow and has a spool shape.

15. An aircraft, comprising:
a body;
a wing, coupled to and extending from the body in a spanwise direction;
a flap, coupled to the wing and extendable from the wing; and
a system, coupled to the wing and comprising:
a geared rotary actuator, comprising a drive gear that is rotatable about a first rotational axis;
a crank shaft, comprising a driven gear in gear meshing engagement with the drive gear of the geared rotary actuator to rotate the crank shaft about a second rotational axis, wherein the second rotational axis is angled relative to the first rotational axis, and wherein the crank shaft further comprises a central channel that is coaxial with the second rotational axis and extends entirely through the crank shaft;
a crank arm, co-rotatably coupled to the crank shaft and coupled with the flap, wherein rotation of the crank shaft about the second rotational axis rotates the crank arm and moves the flap in a direction perpendicular to the second rotational axis;
a torque shaft passing through the geared rotary actuator and the central channel of the crank shaft; and
a torque tube, co-rotatably coupled with the torque shaft and rotatably coupled with the drive gear to drive rotation of the drive gear about the first rotational axis,
wherein:
the torque shaft passes through the central channel of the crank shaft without contacting the crank shaft; and
the torque shaft and the torque tube are rotatable about the first rotational axis.

16. The aircraft according to claim 15, wherein:
the first rotational axis is parallel to a spanwise direction of the wing; and
the direction perpendicular to the second rotational axis is a streamwise direction of the wing.

17. The aircraft according to claim 15, wherein
a diameter of the central channel varies along the second rotational axis.

18. The aircraft according to claim 17, wherein the diameter of the central channel decreases and increases along the second rotational axis.

19. The aircraft according to claim 15, further comprising:
a second flap, coupled to the wing and extendable from the wing; and
a second system, coupled to the wing;
wherein:
a crank arm of the second system is coupled to the second flap; and
the second system comprises a second-system torque tube co-rotatably coupled with the torque shaft of the system and rotatably coupled with a drive gear of a geared rotary actuator of the second system to drive rotation of the drive gear of the geared rotary actuator of the second system about the first rotational axis.

20. A method of actuating a flap, coupled to a wing of an aircraft, in a streamwise direction relative to the wing, the method comprising:
- rotating a torque tube about a first rotational axis at a first rotational speed;
- transferring a first torque from the torque tube to a planetary gear set of a geared rotary actuator;
- rotating a drive gear of the geared rotary actuator about the first rotational axis, which is parallel to a spanwise direction of the wing, at a second rotational speed less than the first rotational speed, wherein the drive gear is driven by the planetary gear set;
- transferring a second torque, which is greater than the first torque, from the drive gear to a driven gear of a crank shaft to rotate the driven gear of the crank shaft about a second rotational axis that is angled relative to the first rotational axis and is perpendicular to the streamwise direction;
- rotating a crank arm in the streamwise direction in response to rotation of the driven gear about the second rotational axis; and
- translationally moving the flap in the streamwise direction in response to the crank arm moving in the streamwise direction, wherein:
- the crank shaft comprises a central channel that is coaxial with the second rotational axis and extends entirely through the crank shaft; and
- a diameter of the central channel varies along the second rotational axis.

* * * * *